United States Patent [19]

Machnee

[11] Patent Number: 4,500,017
[45] Date of Patent: Feb. 19, 1985

[54] DISPENSING WHEEL AND SHAFT MOUNTING ARRANGEMENT THEREFOR

[75] Inventor: Cecil B. Machnee, Yorkton, Canada

[73] Assignee: Morris Rod-Weeder Co. Ltd., Yorkton, Canada

[21] Appl. No.: 420,775

[22] Filed: Sep. 21, 1982

[30] Foreign Application Priority Data

Jan. 29, 1982 [CA] Canada .................... 395203

[51] Int. Cl.³ ............................................ F16H 55/22
[52] U.S. Cl. ...................................... 222/288; 74/451
[58] Field of Search ................ 74/439, 447, 448, 451; 222/292, 312, 288, 313; 403/356, 358, 344

[56] References Cited

U.S. PATENT DOCUMENTS

| | | | |
|---|---|---|---|
| 712,175 | 10/1902 | Berlin | 222/288 |
| 1,616,406 | 2/1927 | Bahan | 74/451 |
| 1,758,607 | 5/1930 | Johnson | |
| 3,452,964 | 7/1969 | Bibeault | 74/451 X |
| 3,487,903 | 1/1970 | Stickan | 403/356 X |

FOREIGN PATENT DOCUMENTS

| | | | |
|---|---|---|---|
| 1103996 | 6/1981 | Canada | |
| 24014 | 9/1883 | Fed. Rep. of Germany | 74/451 |
| 837022 | 3/1952 | Fed. Rep. of Germany | |

OTHER PUBLICATIONS

Bernacki et al., *Agricultural Machines, Theory and Construction*, vol. I, National Technical Information Svc., TT69-50019, pp. 629-643.
Nordsten Combi-Matic Brochure (10 pp.), published by T. Nordsten AS of Denmark.
Nordsten List-o-Matic Brochure (13 pp.), published by T. Nordsten AS of Denmark.
*Agricultural Engineers Handbook*, McGraw Hill Book Company, 1969, pp. 172-175.
*Principals of Farm Machinery*, Third Edition, AVI Publishing Company, Inc., Westport, Connecticut, 1978, pp. 218-221.
J. M. Shippen et al., *Basic Farm Machinery*, vol. II, Pergamen Press, 1966, pp. 30-33.

*Primary Examiner*—Stanley H. Tollberg
*Attorney, Agent, or Firm*—Jones, Tullar & Cooper

[57] ABSTRACT

Seed metering and particle dispensing wheels and to a mechanism for mounting such wheels or other rotative elements to a shaft are disclosed. The wheel has a C-shaped major part with a central opening for receiving the shaft, the free edges of the major part defining a slot extending from the opening to the wheel periphery. A minor part is receivable in the slot to complete the wheel. The minor part at its inner end, and the shaft, are provided with cooperating surfaces which, when engaged, provide a drive connection between the shaft and the wheel. To remove a wheel from the shaft the minor part is withdrawn from the slot and the major part moved transversely of the shaft so that the shaft passes through the empty slot. Replacement or additional wheels can be assembled to the shaft using the reverse procedure. The major and minor parts can have cooperating detents thereon to lock them together, the locking force of which can be overcome if the wheel binds while the shaft tries to rotate, so that the driving engagement between the shaft and wheel is disrupted and little or no damage to the wheel results.

21 Claims, 14 Drawing Figures

DISPENSING WHEEL AND SHAFT MOUNTING ARRANGEMENT THEREFOR

This invention relates in general to the mounting of rotating elements on a rotatable shaft and in particular to a particle metering or dispensing wheel and its mounting to a rotatable shaft.

BACKGROUND OF THE INVENTION

There are three basic types of bulk flow seed or material metering devices: namely the fluted wheel with slide type; the internal force feed type; and the external tooth force feed type. The present invention is particularly applicable to devices of the last-mentioned type.

In present art devices a toothed metering wheel is mounted to a shaft which can be rotated at different rates to provide different rates of material dispensing. Different rates can also be obtained by using "fine" or "coarse" wheels, that is wheels having a large or small number, respectively, of seed receiving pockets about the circumference. Alternatively, a system such as is shown in Canadian Pat. No. 1,103,996 issued June 30, 1981 to Amazonen-Werke H. Dreyer G.m.b.H. & Co. KG could be utilized, that system including a fine wheel and a coarse wheel side by side on the same shaft and couplable together to obtain a different feeding rate. When seeding coarse grains with this system the fine wheel only serves to drive the coarse wheel, playing a very small role in the actual dispensing operation. The operator is also limited in the variety of wheels which are available to seed an even larger variety of seeds since he has no choice beyond the dispensing wheels purchased with his seeder. Furthermore, if a seed wheel is damaged or worn the operater must dismantle a large portion of his machine to replace the offending seed wheel.

It is very desirable to be able to readily change worn or damaged seed wheels and to be able to seed at rates beyond what is available through the machine transmission and/or through the use of presently-available fine/coarse seed wheel combinations.

SUMMARY OF THE INVENTION

The present invention has as its primary purpose the solution to the two major aforementioned problems. By utilizing dispensing wheels incorporating the present invention: (a) the farmer can quickly change a worn or broken seed wheel on a shaft; (b) the farmer has available to him readily replaceable and disengageable seed wheels which can be used singly or in combination, along with the limited adjustment range of the machine transmission to achieve almost any desired seeding or dispensing rate; and (c) the farmer can change the seed or dispensing wheel to one or more best suited to dispense different kinds (sizes) of seed or other materials such as fertilizers.

In its broadest form the present invention provides a rotative element mountable on a shaft for rotation therewith, the element comprising a generally C-shaped major part having a transverse shaft receiving opening therethrough, with the free edges of the major part defining therebetween a slot extending from the opening to the outer preiphery of the major part; and a minor part, the minor part being provided with means engageable with cooperating means in the shaft when the minor part is fully received in the slot for providing a driving connection between the shaft and the rotative element.

From the above it is seen that in its broadest sense the present invention is not restricted to dispensing wheels per se, in that its particular novelty resides in the system for mounting the wheel, or any analogous rotative element, to the shaft. Thus the invention has utility in the mounting of gears, pulleys, etc. to shafts, although it is described hereinbelow with particular reference to seeders and other agricultural implements.

With the present invention the aforementioned major and minor parts cooperate together to form a complete dispensing wheel, with the desired number of "teeth" projecting uniformly radially from the outer periphery of each part to define dispensing pockets therebetween. In a particular embodiment the shaft has a V-groove extending longitudinally and the minor part has converging edge surfaces which are engageable with the shaft V-groove to provide the driving connection between the shaft and the wheel. Should it be necessary to remove a wheel from the shaft it is only necessary to withdraw the minor part from its slot in the major part and to then remove the major part from the shaft. A new wheel can be assembled to the shaft in a reverse operation, with the converging edge surfaces of the minor part being brought into engagement with the V-groove of the shaft as it is slid into the slot in the major part. Appropriate detents can be provided in the two parts to hold them together as the shaft rotates.

Should the wheel encounter an obstruction the shaft will impart a radially outwardly directed force through the converging surfaces of the minor part, since the shaft is trying to overrun the obstructed wheel. When such force overcomes the locking strength of the detents the minor part will be forced radially outwardly of the wheel until the shaft can rotate freely. No damage to the wheel will occur and when the obstruction has been cleared the minor part can be slid back to re-establish the driving connection between the shaft and the wheel.

The farmer has other advantages as well by using seed or dispensing wheels incorporating the present invention. For example, three or four separate wheels of different feed rates could be assembled to the shaft and only the desired one(s) brought into driving engagement with the drive shaft. The shaft would merely rotate freely in the other wheel(s). This feature allows different feeding rates to be obtained and also permits ready adjustment to the type of seed to be dispensed. For example, for long grass seeds or corn it may be suitable to have adjacent wheels rotating whereas fine seeds or granules may be best dispensed with a single wheel or alternate wheels rotating.

Economies can be achieved with this invention, especially in the cost of the labour and down time required to change prior art seed wheels. Further economies in initial and replacement costs are realized when the seed wheels of the present invention are made of plastic materials. Also, since the rate of dispensing can be varied through providing different wheels economies can be obtained by using less expensive transmissions since the farmer no longer has to rely on the transmission alone to provide the varying dispensing rate.

Other features and advantages of the present invention will be found in the following description.

DESCRIPTION OF THE PREFERRED EMBODIMENT

Figure 1:
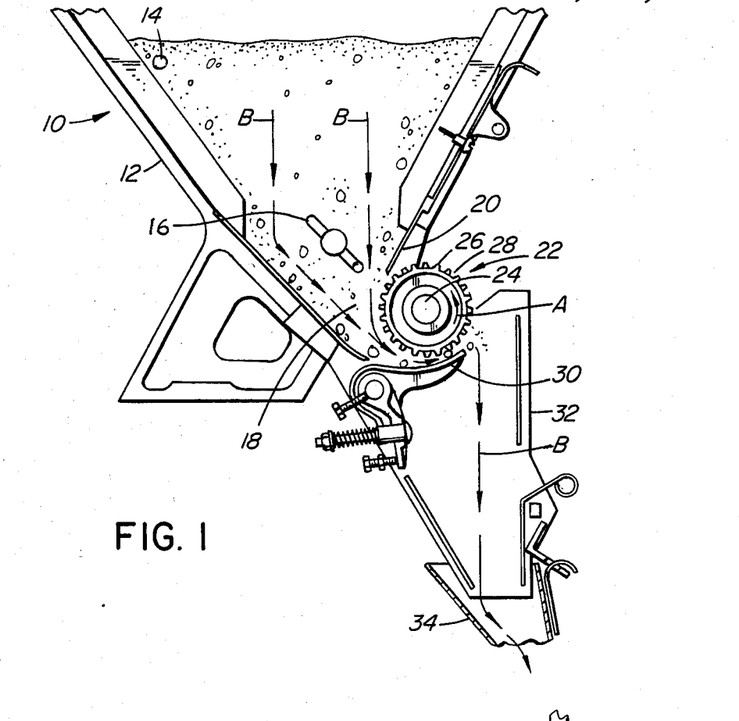
FIG. 1 shows one type of agricultural implement in which the present invention finds advantage.

FIG. 1 illustrates in general form one type of dispensing apparatus in which the present invention could be favourably utilized. The apparatus as shown represents a conventional seeder, namely an agricultural implement which dispenses seeds and/or fertilizers and/or chemicals in metered amounts from a storage area to a delivery site. The seeder 10 has a hopper 12 holding the seeds 14 or other material to be dispensed. A rotatable mixer 16 keeps the seeds flowing towards the outlet 18 the size of which can be varied by way of the adjustable plate 20.

Adjacent the outlet 20 from the hopper is a dispensing device such as a feed wheel 22. The feed wheel 22 is mounted on a shaft 24 for rotation therewith in the direction of the arrow A and is provided with a plurality of generally radially extending projections 26. Adjacent projections define therebetween a pocket 28 sized to pick up from said outlet a seed or other predetermined quantity of the material to be dispensed. The material picked up by the feed wheel is moved past the closely conforming wall 30 of the dispensing device and is deposited in the manifold 32 whence it flows at a metered rate through the delivery conduit 34 to the delivery site. Material flow is shown by the paths B.

If a material 14 of different consistency is to be dispensed or if the dispensing rate is to be changed it may be necessary to replace the feed wheel 22 with a different feed wheel, namely one having larger or smaller pockets between the projections 26. Replacement also is necessary if the feed wheel has been damaged or is worn. As previously discussed replacement or changing of existing feed wheels is presently a labourintensive task requiring several different tools and a considerable degree of skill which can only be acquired "on the job". The present invention overcomes these problems with a novel means of attaching the feed wheel 22 to a shaft 24 such that a simple manipulation is all that is required to remove a feed wheel from a shaft or to secure a feed wheel to a shaft. Furthermore, while the attaching means of the present invention flowed from problems in the realm of agricultural equipment it is clear that the advantages of the invention can reach well beyond the agricultural field. In fact the attaching means of this invention can be used in practically any situation wherein a rotative element is to be attached to a shaft. Examples would be gears, cams, pulleys, idler wheels, etc. Bearing in mind its applicability beyond the realm of agricultural dispensing the present invention will, however, be described hereinbelow with reference to agricultural implements such as seeders and fertilizer dispensers.

Figure 2:
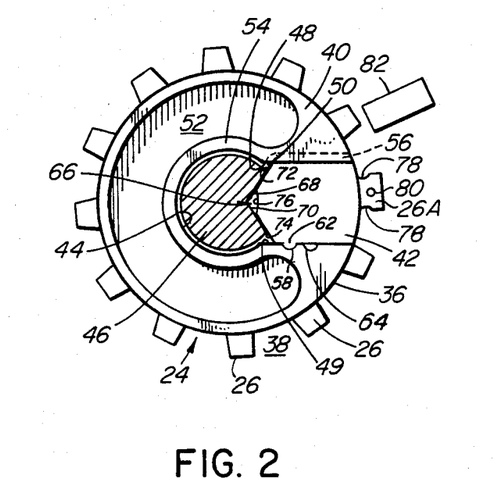
FIGS. 2 and 3 show the principles of the invention in a coarse seed wheel.
Figure 3:
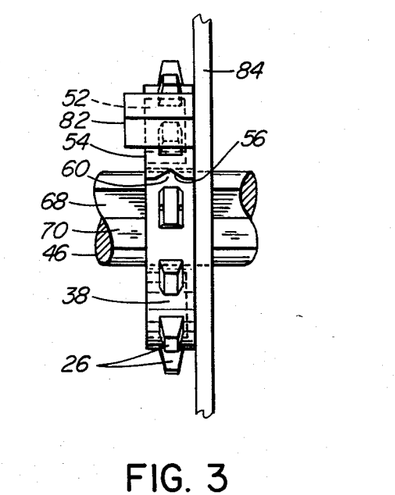

FIGS. 2 and 3 illustrate a first embodiment of a feed wheel 24 having spaced apart radially extending dispensing members 26 projecting from the peripheral surface 36 of the wheel, with adjacent members 26 defining a pocket 38 therebetween, the pocket 38 being appropriately sized to accept a preselected number, such as one, of seeds therein. The wheel 24 has two parts, namely a generally C-shaped major part 40 and a minor part 42. Both parts are desirably moulded from a suitable plastics material such as nylon (glass filled or plain). Other materials could be used and, in fact, in certain circumstances both parts could be metallic or the part 40 could be plastic and the part 42 could be metallic.

The major part 40 has a transversely extending opening 44 therethrough for reception of a shaft 46, to be discussed hereinbelow. The free edges 48, 49 of the major part 40 define therebetween a slot 50 which extends from the opening 44 to the periphery 36 of the major part. If desired, from the standpoint of saving material, the major part 40 may be moulded with a C-shaped cavity or recess 52 extending inwardly from one or both sides of the part 40, defining a boss or bushing 54 surrounding the opening 44.

Extending inwardly along one free edge 48 is a keyway, guide slot or groove 56 shown in FIG. 3 as having a generally V-shape in cross-section. Extending transversely of the opposite free edge 49 is a detent recess 58 which projects away from the slot 50 and, as shown, desirably has an arcuate surface.

The minor part 42 is intended to be slidably receivable in the slot 50 and to that end is has, along one edge thereof a key or projection 60 which matingly engages with the guide slot 56 provided in the free edge 48 of the major part 40. The opposite edge of the minor part 42 has a transversely extending detent projection 62 sized to lockingly engage with the detent recess 58 in the free edge 49 of the major part. A second detent recess 64 is desirably provided adjacent to but radially outwardly of the detent recess 58 in the major part.

In the position shown in FIG. 2 it is seen that when fully inserted into or received in the slot 50 the minor part 42 completes the wheel 24 with the peripheral surface of the minor part being a continuation of the peripheral surface of the major part. In this position the detent projection 62 engages the detent recess 58 so as to lock the minor part in place relative to the major part.

The minor part 42 and the shaft 46 are each provided with cooperating means which, when engaged, permit rotating driving forces from the shaft to be imparted to the wheel 24 through the minor part 42 to achieve rotation of the wheel 24. In the embodiment as illustrated the shaft 46 has a longitudinally directed V-groove 66 defined by converging surfaces 68, 70. The minor part 42 has mating converging surfaces 72, 74 which, with the minor part fully engaged in the slot 50, engage with the surfaces 68, 70 respectively in the shaft, such engagement being sufficient to provide the drive from the shaft to the wheel 24. Desirably the minor part 42 also has an inwardly arcuate surface 76 between the surfaces 72, 74 and of essentially the same radius of curvature as the opening 44 in the major part 40.

While not absolutely essential to the invention it is recommended that the width of the slot 50, that is the distance between free edges 48 and 49, be less than the maximum diametral thickness of the shaft 46 (i.e. the outer diameter thereof) but greater than the minimum diametral thickness (i.e. the distance through the shaft centre from the periphery to the chord connecting the points of intersection of the surfaces 68, 70 with the shaft periphery).

Assuming that the wheel 24 is mounted to the shaft 46 as seen in FIG. 2, with the minor part 42 received in the slot 50 and the surfaces 68, 72 and 70, 74 in engagement and it is desired to remove the wheel from the shaft the following steps would be taken. First of all, the minor part 42 would be removed from the slot 50 by exerting a radially outwardly directed force thereon. This could be effected by grasping the projection 26A on the minor part by way of the recesses 78 therein, or by inserting an appropriate removal tool (such as an L-shaped length of wire) into the through hole 80 in the projection 26A and applying the removal force to the tool.

Once the minor part has been removed the major part 40 is rotated relative to the shaft 46 until one of the edges 48, 49 is parallel to the aforementioned chord used to define the minimum diametral thickness of the shaft 46. Since the width of the slot 50 is greater than that thickness the wheel major part 40 may be withdrawn radially from the shaft, with the shaft 46 in essence passing through the slot 50.

A new wheel may be assembled to the shaft by reversing the above proceedure. Thus, a new wheel major part would be slid over the shaft 46 by way of the slot 50; the minor part 42 would be slid into the slot 50; the wheel parts would be rotated relative to the shaft to align the minor part 42 with the groove 66; and the minor part 42 would be slid home so that the surfaces 68, 72 and 70, 74 enter into driving engagement with each other and the detent projection 62 engages with the detent recess 58.

It should be mentioned that since the major part 40 is formed from a plastics material it will have some resiliency so that the arms, at the free ends thereof, will be spread slightly, as the minor part is slid into the slot 50, by the detent projection 62 until such time as the recess 58 is engageable therewith. At that time the resilient arms will "snap back" to provide sufficient locking action between the major and minor wheel parts.

Should there be any binding of the wheel due to jamming thereof, the engaging driving surfaces between the shaft 46 and the minor part 42 will act to avoid damage to the wheel 28. Should the wheel 24 be stopped relative to the shaft 46, and assuming counterclockwise rotation thereof, the additional driving forces applied by shaft groove surface 70 to the surface 74 will impart a radially outward force component to the minor part 42, sufficient to overcome the locking action of the projection 62 and recess 58 combination. Thus the minor part 42 will be pushed radially outwardly in the slot 50 by that force component. At a point, defined positively by recess 64, in the radial outward movement of the minor part 42 the shaft 46 will be able to rotate, completely unemcumbered by the wheel 24, since clearance for such rotation has been provided by the arcuate surface 76. Thus at that point the surface 76 provides essentially a continuation of the opening 44 in the major part and the shaft 46 can rotate freely in the opening. No driving forces will be applied to the wheel 24 and thus no great damage will be sustained by the bound wheel. When the obstruction has been cleared the minor part 42 can be again slid home in the slot 50 to re-form the driving connection between the shaft 46 and the wheel 28.

If desired a stop 82 may be secured to the support structure 84 for the shaft 46 so that when the minor part is pushed radially outwardly of the slot 50 it will encounter the stop 82 as the wheel rotates, the engagement of the minor part 42 with the stop 82 preventing any further rotation of the wheel 24. Such engagement is shown in FIG. 4 and in FIG. 12, to be discussed hereinafter.

Figure 4:
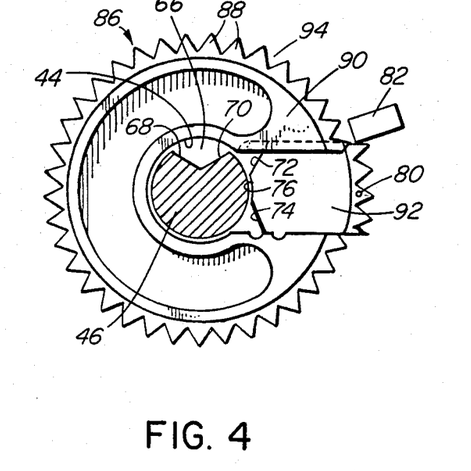
FIGS. 4 and 5 show the principles of the invention in a fine seed wheel.
Figure 5:
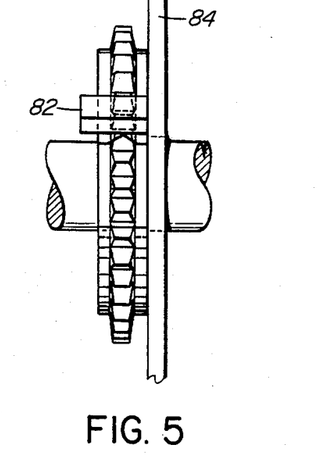

FIGS. 4 and 5 show a second embodiment of a wheel incorporating the present invention. In this case the wheel 86 has a series of saw-tooth like projections 88 extending about the periphery of the major and minor parts 90, 92 respectively. Adjacent teeth 88 define therebetween a pocket 94. As is readily seen from FIG. 4 the pockets 94 of a wheel 86 are considerably smaller than the pockets 38 of the wheel 24. Wheel 24 may be considered as a "coarse" wheel while wheel 86 may be considered as a "fine" wheel.

FIG. 4 also shows the position of minor part 92 out of driving engagement with shaft 46 as has been described with respect to wheel 24. It is readily apparent from FIG. 4 that the illustrated position of the minor part permits free rotation of the shaft 46 relative to the wheel.

FIGS. 6 to 11 show another form of construction for a wheel, wherein the major part thereof is itself formed in two pieces to create a hollow major part. In this embodiment the minor part can be a single-piece unit or it too may be formed as two pieces. In the discussion to follow the minor part is considered to be a single piece.

Figure 6:
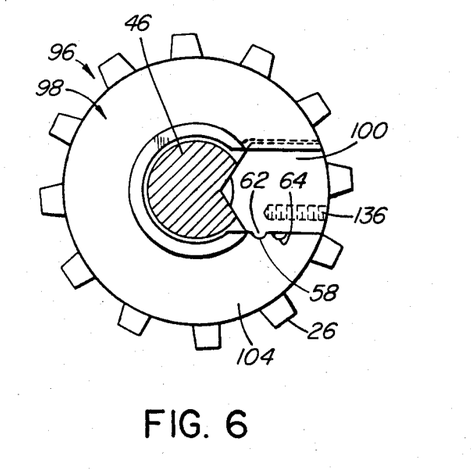
FIGS. 6 and 7 show a two piece seed wheel in an assembled condition.
Figure 7:
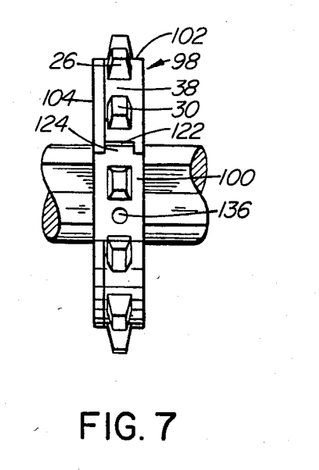

FIGS. 6 and 7 show a complete "coarse" wheel 96 having a major part 98 and a minor part 100 mounted on a shaft 46. Since the construction of the wheel 96 itself is of interest herein it is sufficient to point out that the shaft driving engagement structure and the detent locking mechanism is the same as shown in, and described with regard to, FIGS. 2 to 5. Any additional description will pertain only to any differing structural features.

With particular regard to FIG. 7 it is seen that the major part 98 is formed in two pieces. A first part 102 carries the projections 26 which define therebetween the pockets 38. A second part 104 completes the wheel 96, acting as a side cover for the wheel.

Figure 8:
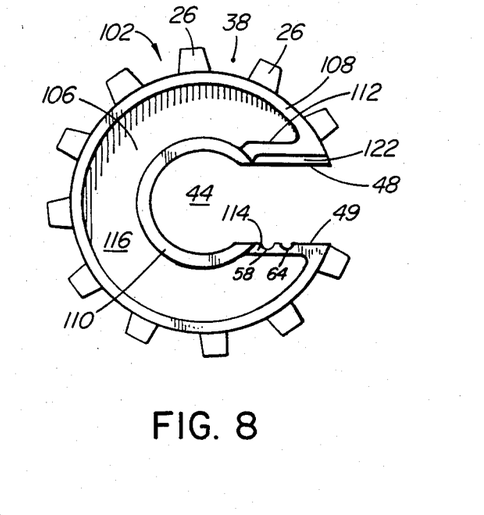
FIGS. 8 to 11 show the components of the two piece seed wheel of FIGS. 6 and 7.
Figure 9:
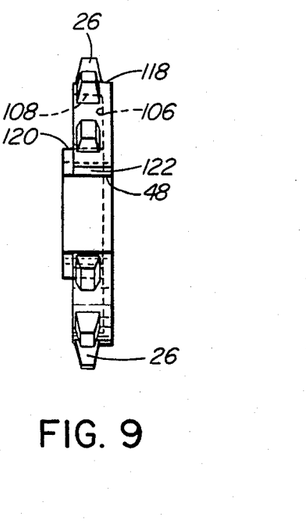

FIGS. 8 and 9 illustrate the first part 102 as a hollow C-shaped element having a side wall 106, a peripheral wall 108, a C-shaped boss 110 generally surrounding the opening 44 and free edge walls 112, 114 extending from the ends of boss 110 to the ends of the peripheral wall 108. The various walls define a cavity 116. According to FIG. 9 the projections 26 extend outwardly from the peripheral wall 108 with the inner edges thereof adjacent the inner or free edge of wall 108 so as to leave a land portion 118 adjacent the side wall 106. The width of land 118 is essentially equal to the thickness of the second wheel part 104. It is also noted that the boss 110 extends inwardly beyond the free edge of wall 108 by a distance 120 which is also essentially equal to the thickness of the second wheel part 104.

This embodiment utilizes a guiding slot 122 which is somewhat different from the slot 56 used in the first embodiment. As best seen in FIG. 7 the guide slot 122 is generally rectangular in cross-section for mating engagement with a correspondingly shaped rectangular key member 124 provided along one edge of the minor part 100.

With regard to FIGS. 8 and 9 the slot 122 is formed by having the wall 112 positioned inwardly from the free edge 48 of the major part as defined by the side wall 106. Thus the slot 122 is defined by the adjoining surfaces of the walls 106 and 112.

The opposite free edge 49 of the major part 102 is the exposed surface of the wall 114, and the detent recess 58 is formed thereon.

Figure 10:
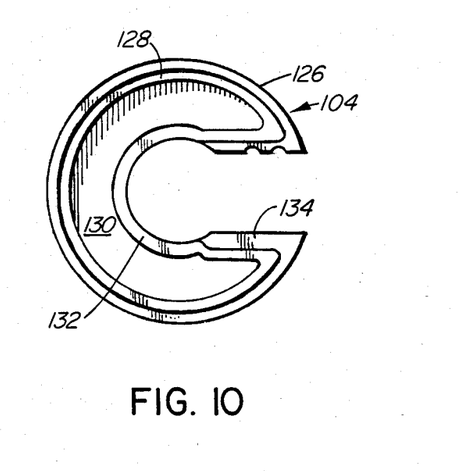
Figure 11:
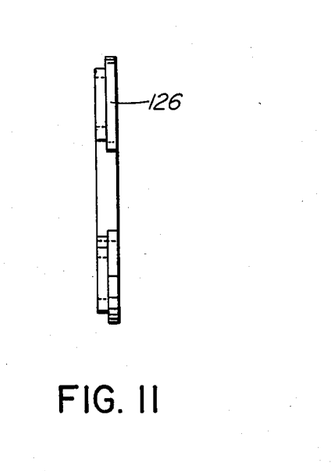

FIGS. 10 and 11 show the side cover 104 which fits on and is secured to the first part 102 either by a snap fit or by suitable adhesive which bonds the mating surfaces together. The side cover includes a flat side member 126 which has its periphery conforming to the periphery of the first part 102. Extending outwardly from the side member 126 is a flange 128 which encloses a cavity area 130. The flange 128 is inset from the edges of the side member by a distance equal to the width of the peripheral wall 108 and the edge walls 112, 114 of the first part so that the flange 128 will fit within those walls when the side cover is mated to the first part 102. Similarly the flange portion 132 is situated so that its inner, arcuate periphery will mate with the outer arcuate periphery of the boss wall 110 on the first part. Thus when the second part or side cover 104 is mated with the first part 102 the radially outermost inner surfaces of the side member 126 will abut, or lay on, the free edges of the walls 108, 112, 114 of the first part 102 as shown in FIG. 7. The exposed part 134 of the side member 126 will complete the slot 122 when the two parts 102, 104 are secured together.

Figure 12:
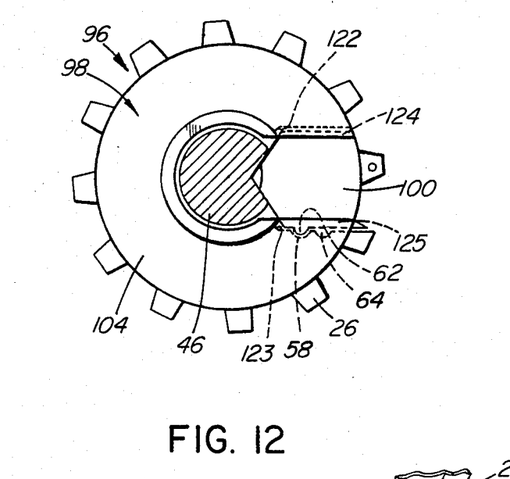
FIGS. 12 and 13 show an alternative structure for guiding the minor part in the slot of the major part.
Figure 13:
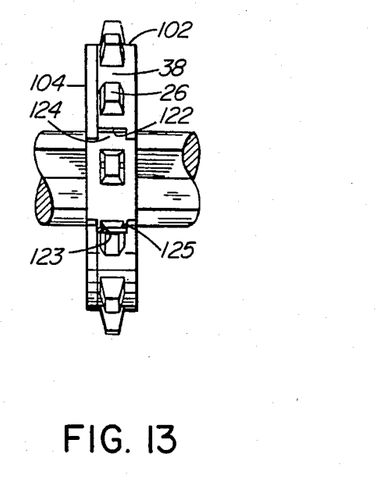

If desired, as shown in FIGS. 12 and 13 a slot 123 similar to slot 122 could be provided along the free edge 49 of the dispensing wheel for mating with a corresponding key 125, containing detent projection 62, on the minor part to provide additional guiding to the minor part 100 as well as additional strength against any twisting of the major and minor parts relative to each other. The detent recesses 58, 64 would then be provided in the slot or key way 123.

It is desirable that the major part be provided with the two detent recesses 58 and 64 as shown in FIG. 2. The main purpose of the second detent recess 64 is to position the minor part 42 is such a manner that the bearing arcuate surface 76 is positioned to complete the circumference formed by bearing surface 44. In this position the shaft 46 can rotate freely without imparting rotation to the wheel. If the bearing surface 76 is positioned beyond its correct position the rotating shaft 46 could easily work its way into the slot 50 and cause the dispensing wheel and shaft to seize together. FIG. 4 illustrates how the bearing surface 76 helps complete the circumference formed by bearing surface 44 so that the shaft 46 is free to rotate within the wheel. The minor part 92 as illustrated in FIG. 4 may be placed in this disengaged position intentionally for various seeding or repair purposes or it may lodge in this position due to some obstruction causing the minor part 92 to be pushed out.

FIGS. 6 and 7 show an alternative device for deliberately removing the minor part 100, namely a threaded bore 136 which is adapted to receive a threaded member such as a bolt. The bolt could be threaded into bore 136 and a radially directed force applied thereto to remove the minor part 100 from engagement with the major part 98.

Figure 14:
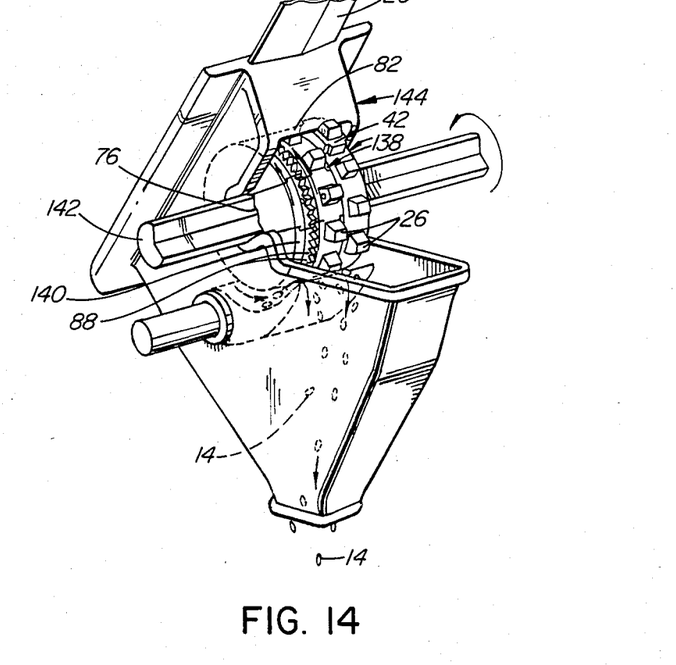
FIG. 14 shows a typical installation using three seed wheels.

FIG. 14 shows a partial assembly, in perspective, of a dispensing system such as is shown in FIG. 1. In FIG. 14 a plurality of seed dispensing wheels such as coarse wheels 138 (similar to wheels 40, 96 of FIGS. 2, 3, 6–14) and fine wheel 140 (similar to wheel 86 of FIGS. 4 and 5) are shown mounted side by side on the common shaft 142 (identical to shaft 46) and are partially enclosed by a seeding housing 144. FIG. 14 shows a combination of two coarse wheels 138 and a single fine wheel 140 although more or fewer wheels could be used and any desired combination of wheels having different degrees of "coarseness" (number of projections 26, 88) could be used. A coarse wheel will dispense larger seeds than a fine wheel or will dispense the same size of seed at a greater rate than a fine wheel. With this invention the operator has the advantage of quickly and easily selecting the combination of seed wheels to give him the desired seeding pattern. For example if a fine seed is to be seeded at a low rate only a single fine wheel in the seed housing would need be used. Thus, if a combination of two coarse wheels 130 and one fine wheel 140 were provided in the seed housing, the operator would disengage the two coarse wheels. This would be done by extracting minor part 42 so that detent projection 62 engages with detent recess 64 (see FIG. 4). Surface 76 of the minor part 42 then will complete the opening 44 in the disengaged wheel. The shaft 46 can then freely rotate within the opening 44 without jamming against the slot 50. When minor part 42 is extracted to the position where detent projection 62 and detent recess 64 mate it will extend from the periphery of the dispensing wheel to such an extent that it or one of the teeth 26, 88 will impinge on the stop 82 shown in FIG. 14 as the upper edge of the housing 144. This will prevent the dispensing wheel from rotational movement due to friction between the shaft 46 and the bearing surfaces of the opening 44. Thus when seeding fine seeds at lower rates the operator may disengage one or more wheels and have fewer or only one wheel engaged to dispense seed. The wheels which are disengaged do not rotate and seed is prevented from being dispensed from their positions. A variety of numbers of engaged wheels and types of wheels may be used in conjunction with the seeder transmission to obtain a variety of rates. This feature of varying dispensing rates by disengaging dispensing wheels augments the work of the transmission.

Various embodiments of the present invention have been illustrated, those embodiments being centered about agricultural applications, and dispensing wheels in particular. As previously suggested the principles disclosed herein could be used to secure or attach almost any type of rotative element to a suitably configured shaft, especially when the torque to be transmitted from the shaft to the rotative element is not overly great. It is therefore expected that skilled practitioners in the art, agricultural or otherwise, would be able to modify the present invention as disclosed without departing from the spirit thereof. Accordingly, the scope of protection to be afforded this invention is to be determined from the claims appended hereto.

The embodiments of the invention in which an exclusive property or privilege is claimed are defined as follows:

1. A dispensing wheel mountable on a shaft having a longitudinally extending V-shaped groove in the outer surface thereof and being rotatably mounted in an outlet of a dispensing apparatus, comprising: a generally C-shaped major part defining a major peripheral surface portion of said wheel and having a transverse shaft-receiving opening therethrough, the free edges of said major part being parallel and defining therebetween a slot extending from said opening to the outer periphery of said major part; and a minor part receivable in said slot, being lockingly engageable with said major part, and defining the remainder of the peripheral surface of said wheel when fully received in said slot, said minor part being provided with drive means in the form of a projection having converging edge surfaces matable with said V-shaped groove in said shaft, whereby said projection is automatically engageable with said groove when said minor part is fully received in said slot for providing a driving connection between said shaft and said dispensing wheel.

2. The dispensing wheel of claim 1 wherein a plurality of spaced apart members project radially outwardly from the peripheral surface of the wheel, adjacent members defining a material receiving and dispensing pocket therebetween.

3. The dispensing wheel of claim 1 wherein said converging edge surfaces terminate at an inwardly arcuate surface having a radius of curvature generally equal to the radius of said opening in said major part.

4. The dispensing wheel of claim 3 wherein at least one of the free edges of said major part has an inwardly directed guide slot extending therealong and the mating edge of said minor part has a projection extending therealong for mating reception in said guide slot.

5. The dispensing wheel of claim 4 wherein at least said major part is formed of resilient material, at least one of the free edges of said major part has a transversely extending detent recess therein, and the mating edge of said minor part has a transverse detent projection thereon so that when said minor part is fully received in said slot said detent projection engages said detent recess to achieve said locking engagement of said minor part with said major part.

6. The dispensing wheel of claim 9 wherein said one free edge of said major part has a second transverse detent recess therein between said first-mentioned detent recess and the peripheral surface thereof such that when said minor part is moved radially outwardly away from said shaft to where said detent projection engages said second detent recess, said shaft can rotate within said wheel without imparting any drive force to said wheel.

7. The dispensing wheel of claim 5 wherein said guide slot is generally V-shaped in cross-section.

8. The dispensing wheel of claim 5 wherein said guide slot is generally rectangular in cross-section.

9. The dispensing wheel of claim 1, 2 or 3 wherein said major part is constructed of two parts, both of C-shape, a first part being hollow and the second part being a cover for said first part.

10. A dispensing device for use with material dispensing apparatus including hopper means for the material, the hopper means having a dispensing outlet and means for mounting said device for metered dispensing of material through the outlet from the hopper means, said device comprising: a shaft adapted for journaled support in said mounting means and for connection to rotative drive means, said shaft having a longitudinally extending V-shaped groove in an outer surface thereof; and dispensing wheel means, said wheel means including a generally C-shaped major part defining a major peripheral portion of said wheel means and having a shaft-receiving opening therethrough, the free edges of said major part being parallel and defining therebetween a slot extending from said opening to the outer periphery of said major part, and a minor part receivable in said slot, being lockably engageable with said major part, and defining the remainder of the peripheral surface of said wheel means when fully received in said slot, said minor part including a projection having converging edge surfaces matable with said V-shaped groove in said shaft whereby said projection is automatically engageable with said groove when said minor part is fully received in said slot for providing a driving connection between said shaft and said wheel means.

11. A dispensing device of claim 10 wherein a plurality of spaced apart members project radially outwardly from the peripheral surface of the wheel means, adjacent members defining a material receiving and dispensing pocket therebetween.

12. A dispensing device for use with material dispensing apparatus including hopper means for the material, the hopper means having a dispensing outlet and means for mounting said device for metered dispensing of material through the outlet from the hopper means, said device comprising:
shaft means adapted for journaled support in said mounting means and for connection to rotative drive means; and
dispensing wheel means, said wheel means including a generally C-shaped major part having a transverse shaft-receiving opening therethrough with the free edges of said major part defining therebetween a slot extending from said opening to the outer surface of said major part, and a minor part receivable in said slot and lockably engageable with said major part, the major part defining a major peripheral surface portion of said wheel means and said minor part defining a minor peripheral surface portion so as to complete the peripheral surface of said wheel means when said minor part is fully received in said slot, said minor part and said shaft means being provided with cooperating means including a longitudinally extending V-shaped groove in the outer surface of said shaft means and a pair of converging edge surfaces on said minor part engageable with said V-shaped groove, said cooperating means being engaged when said minor part is received in said slot, thereby achieving a driving connection between the shaft means and said wheel means.

13. The dispensing device of claim 12 wherein said converging edge surfaces terminate at an inwardly arcuate surface having a radius of curvature generally equal to the radius of said opening in said major part.

14. The dispensing device of claim 13 wherein at least one of the free edges of said major part has an inwardly directed guide slot extending therealong and the mating edge of said minor part has a projection extending therealong for mating reception in said guide slot.

15. The dispensing device of claim 14 wherein at least said major part is formed of resilient material, at least one of the free edges of said major part has a transversely extending detent recess therein, and the mating edge of said minor part has a transverse detent projection thereon so that when said minor part is fully received in said slot said detent projection engages said detent recess to achieve said locking engagement of said minor part with said major part.

16. A dispensing device for use in a particulate material dispensing apparatus including a hopper for the material and a dispensing outlet, the device being adapted to be positioned adjacent the outlet for the metered dispensing of material through the outlet from the hopper, the device comprising: a drive shaft journaled in the apparatus so as to extend across the outlet, the shaft being provided with a longitudinally and inwardly extending V-groove in the outer surface thereof, the drive shaft being adapted for connection to a suitable power source for rotation thereof; and a resilient two-part dispensing wheel, a minor part thereof being engageable with the major part to form a complete wheel, the minor part including a pair of parallel edges for engagement with corresponding parallel edges of an open slot portion of the major part, each of the edges of the minor part including key means engageable with corresponding interlocking keyway means in the edges of the slot opening and at least one edge of the minor part including detent projection means for engagement with corresponding detent recess means on the mating edge of the major part, the radially outermost circumferential surface of the minor part forming a continuation of the circumferential portion of the major part when the two parts are engaged together, the radially innermost portion of the minor part including a pair of converging surfaces engageable with the sides of said V-groove and said surfaces terminating at a radially inwardly curved surface, said major part having a generally C-shape in side elevation with a central through opening to receive said shaft, the width between said parallel edges of said major part being less than the maximum diametral thickness of said shaft but equal to or greater than the minimum diametral thickness of said shaft and the outer circumference of said wheel having a plurality of equally spaced radially projecting metering appendages thereon.

17. The apparatus of claim 16 wherein said hopper defines stop means adjacent said outlet for engagement with said minor part to prevent rotation of said wheel means, as said shaft means rotates, when said minor part is not in locking engagement with said shaft means.

18. The apparatus of claim 16 wherein said minor part is provided with means for extracting said minor part from said slot.

19. The apparatus of claim 18 wherein said extracting means comprises a transversely directed hole through a metering appendage on said minor part, said hole being adapted to receive an arm of an extraction tool.

20. The apparatus of claim 18 wherein said extracting means comprises a threaded bore in said minor part adapted to receive a threaded extraction tool.

21. The apparatus of claim 18 wherein said extracting means comprises recessed areas on a metering appendage on said minor part adapted to be grasped by the fingers of an operator to effect extraction of said minor part from said slot.

* * * * *